Nov. 21, 1939.   J. R. SKOVERSKI   2,180,557
FISHHOOK
Filed Nov. 16, 1937

INVENTOR
JOHN R. SKOVERSKI
BY Charles J. Evans
HIS ATTORNEY

Patented Nov. 21, 1939

2,180,557

UNITED STATES PATENT OFFICE 2,180,557

FISHHOOK

John R. Skoverski, Oakland, Calif., assignor to Joseph Schor, San Francisco, Calif.

Application November 16, 1937, Serial No. 174,795

6 Claims. (Cl. 43—28)

My invention relates to snelled hooks; and the broad object of the invention is to provide improved means for fastening a snell to the shank of a hook.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing.

In terms of broad inclusion, the fishhook embodying my invention comprises a shank having a recess therein to provide a socket, and a snell having an end lying in the recess, the portions of the shank about the recess being bent inwardly against the snell to fasten the latter.

Figure 1:
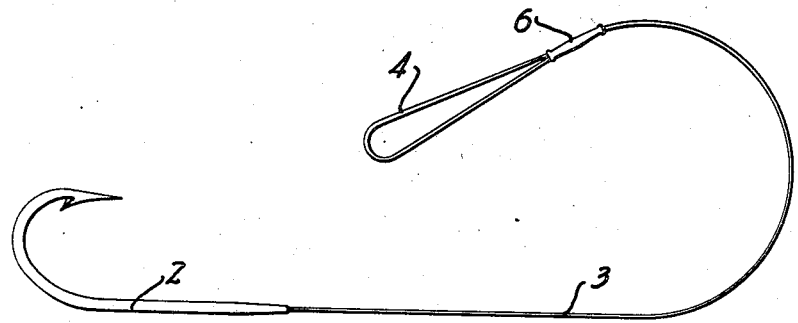
Figure 1 is a side elevational view of a fishhook embodying the improvements of my invention.
Figure 2:
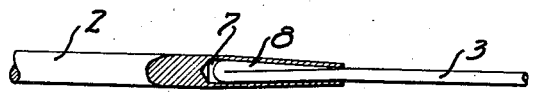
Figure 2 is an axial sectional view showing the socket for receiving the fastened end of the snell.

In greater detail, and referring to Figures 1 and 2 of the drawing, the fishhook of my invention comprises a shank 2 to which is fastened a snell 3 of gut or any other suitable material. The free end of the latter is preferably provided with a loop 4 fastened by suitable means, as by a sleeve 6.

As shown in Figure 2, the end of shank 2 is provided with a recess comprising an axial bore 7, drilled or otherwise formed in the shank to provide a socket for receiving the snell. The end 8 of the snell is preferably folded back and introduced into the socket thus provided, and the portions of the shank surrounding the recess or bore are then bent or crimped inwardly against the snell to fasten the latter. Since the folding back of the snell somewhat enlarges its inner end, and the inbent walls of the shank form a tapered socket, the snell is positively secured in place.

Not only does this construction form a secure fastening for the snell, but it also provides a smooth joint without the bulkiness usually characterizing a snell fastening. In my hook the shank tapers down gradually to the diameter of the snell and the general appearance is that of one continuous strand.

Figure 3:
Figure 3 is a similar view showing a variant form of socket.
Figure 4:
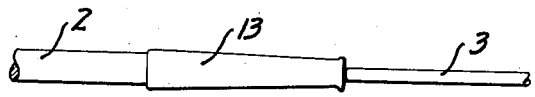
Figure 4 is an elevational view showing another modification of my hook construction, including a sleeve over the fastened end of the snell.
Figure 5:
Figure 5 is a plan view of the grooved socket of Figure 3, showing the groove before the portions of the shank about the groove are bent inwardly against the snell, and also illustrating the arrangement of teeth in the groove for engaging the snell.

Figures 3 and 5 show a variant form of socket in which the recess comprises a groove 9 extending longitudinally of the shank and in which the end of snell 3 is disposed. The shank portions or lips 11 alongside the groove are then bent inwardly against the snell to fasten it. In bending the grooved portions of the shank about the snell, the edges of lips 11 are preferably brought together to close the groove. The socket thus formed completely embraces the snell.

As shown in Figure 3, the snell may project straight into the socket without being folded back, since the bending or rolling in of the metal compresses the snell to give the desired wedging action. In order to further secure the snell a series of teeth 12 may be provided in the recess by cutting transverse grooves in the bottom of the socket. See Figure 5. It is also understood that the end of the snell may be folded back to enlarge its inner end, as shown in Figure 2.

In either of the constructions disclosed the joint may be further secured by providing a metal sleeve 13 about the fastened end of the snell. This sleeve reinforces the inbent wall portions of the shank socket and prevents these wall portions from spreading under tension on the snell. For ordinary purposes however the strength of the joint is ample without the reinforcing sleeve.

I claim:

1. A fishhook comprising a shank having a recess therein to provide a socket, and a snell having an end extending back along itself to form a double thickness thereof and lying in said recess, the portions of the shank about the recess extending inwardly against the snell and thereby fastening the latter.

2. A fishhook comprising a shank having an axial bore therein to provide a socket, and a snell having an end extending into the bore, the portions of the shank about the bore extending inwardly against the snell and thereby fastening the latter.

3. A fishhook comprising a shank having a groove therein to provide a socket, and a snell having an end lying in said groove, the portions of the shank about the groove extending inwardly against the snell and thereby fastening the latter.

4. A fishhook comprising a shank having a groove therein to provide a socket, a snell having an end lying in said groove, and teeth on the shank in the groove and engaging the snell, the portions of the shank about the groove extending inwardly against the snell and thereby fastening the latter.

5. A fishhook comprising a shank having a recess therein to provide a socket, a snell having an end lying in said recess, the portions of the shank about the recess extending inwardly against the snell and thereby fastening the latter, and a sleeve on the shank about the fastened end of the snell.

6. A fishhook comprising a shank, a tubular flange integral with the end of the shank and thereby providing a socket, and a snell having an end lying in the socket, the walls of said flange converging toward the outer end to form a tapered socket for gripping the snell.

JOHN R. SKOVERSKI.